(12) United States Patent
Starace

(10) Patent No.: US 8,104,587 B2
(45) Date of Patent: Jan. 31, 2012

(54) ELEVATOR CAR

(75) Inventor: Raffaele Starace, Buchrain (CH)

(73) Assignee: Inventio AG, Hergiswil NW (CH)

( * ) Notice: Subject to any disclaimer, the term of this patent is extended or adjusted under 35 U.S.C. 154(b) by 677 days.

(21) Appl. No.: 11/272,329

(22) Filed: Nov. 10, 2005

(65) Prior Publication Data

US 2006/0175148 A1   Aug. 10, 2006

(30) Foreign Application Priority Data

Nov. 11, 2004   (EP) .................................... 04405693

(51) Int. Cl.
  *B66B 11/02*  (2006.01)
  *B23P 11/00*  (2006.01)
  *F16B 5/00*  (2006.01)
  *E04H 14/00*  (2006.01)
  *E04B 1/38*  (2006.01)

(52) U.S. Cl. ............ 187/401; 29/428; 29/469; 403/335; 403/338; 52/79.12; 52/270; 52/285.3

(58) Field of Classification Search ................ 52/489.1, 52/588, 7, 64, 775, 764, 75, 30, 79.9, 79.12, 52/270, 285.2, 285.3, 768, 264, 474, 525.01; 187/401, 313, 325, 334; 403/252, 335, 287, 403/338; 29/428, 432, 469, 525.05; *B66B 11/02*
See application file for complete search history.

(56) References Cited

U.S. PATENT DOCUMENTS

| | | | | |
|---|---|---|---|---|
| 2,246,732 A | * | 6/1941 | Hymans | 187/401 |
| 3,631,942 A | * | 1/1972 | Brounn | 187/401 |
| 4,084,720 A | * | 4/1978 | Thurston | 220/690 |
| 4,357,993 A | * | 11/1982 | Halpern et al. | 187/401 |
| 4,617,770 A | * | 10/1986 | Hickman | 52/214 |
| 4,708,222 A | * | 11/1987 | Bills et al. | 187/401 |
| 4,779,707 A | * | 10/1988 | Smith et al. | 187/401 |
| 4,875,553 A | * | 10/1989 | Smith et al. | 187/401 |
| 5,531,052 A | * | 7/1996 | Agar | 52/489.2 |
| 5,564,529 A | * | 10/1996 | Ericson et al. | 187/401 |
| 5,842,545 A | * | 12/1998 | Blaiotta | 187/401 |
| 2004/0195049 A1 | * | 10/2004 | Stobo et al. | 187/401 |

FOREIGN PATENT DOCUMENTS

| | | |
|---|---|---|
| EP | 0 234 324 | 9/1987 |
| EP | 0 585 945 | 3/1994 |
| EP | 0 997 424 | 5/2000 |
| FR | 2672580 A1 * | 8/1992 |
| GB | 2139183 A * | 11/1984 |
| JP | 04023787 A * | 1/1992 |

* cited by examiner

*Primary Examiner* — Michael Mansen
*Assistant Examiner* — Stefan Kruer
(74) *Attorney, Agent, or Firm* — Fraser Clemens; Martin & Miller LLC; William J. Clemens

(57) ABSTRACT

An elevator car consists of a floor, side walls, a back wall and a roof which are each constructed in a modular manner from a plurality of panels and which can be held together by means of connecting elements. The floor is formed from, in total, eight floor panels. The threshold is connected with the floor panels. The side walls each consist of ten wall panels. The back wall consists of eight wall panels and the roof consists of six roof panels. On site, the elevator car can be constructed in a short assembly time by means of plug connections and with a few screw connections. The panel mode of construction enables a low-volume transport of the elevator car to the construction site directly from the punching and changing machine.

14 Claims, 10 Drawing Sheets

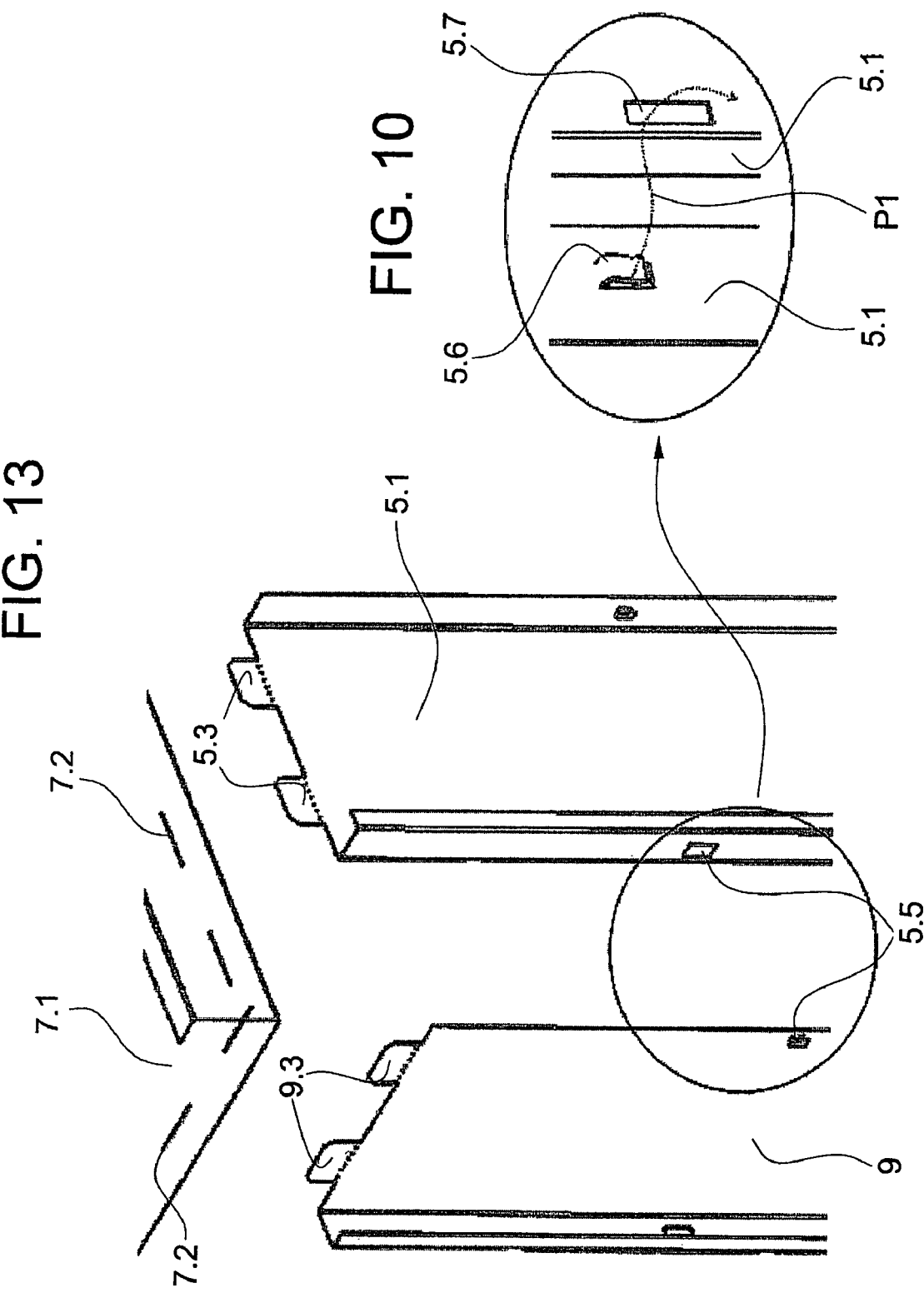

ELEVATOR CAR

BACKGROUND OF THE INVENTION

The present invention relates to an elevator car consisting of a floor, doors, side walls, a back wall and a roof.

An elevator car of modular construction is shown in U.S. Pat. No. 4,779,707. The elevator car consists of a floor, sliding doors with a front wall, side walls, a back wall and a roof. The side walls are connected with the back wall and with the front wall by means of angle elements, wherein clips hold the walls and the angle elements together. Moreover, the walls are screw-connected with the floor. The roof encloses the walls according to the principle of a sleeve roof.

A disadvantage of this known equipment is that the complete walls and roof are costly and bulky and cause high production and assembly costs.

SUMMARY OF THE INVENTION

The present invention provides a remedy and meets the object of avoiding the disadvantages of the known equipment and of proposing an elevator car which is convenient in construction, transport and assembly.

The advantages achieved by the present invention are that the stability of the elevator car, which is constructed all round in modular manner by panels, is guaranteed even in the case of high loads as occur, for example, in goods elevators. Notwithstanding the numerous individual parts for construction of the walls, the roof and the floor only a few more assembly-intensive connecting elements such as screws are necessary. The majority of the connections are advantageously produced by means of clips punched out of the panels themselves or by means of connecting straps. In that case the panels can be produced at the factory simply by an automated punching process and an automated flanging process. On site or at the assembly location the elevator car is for that purpose able to be constructed in a short assembly time by means of plug connections and with few screw connections. On assembly of the elevator car the assembly operative or worker is guided by readily identifiable connecting elements. The panel mode of construction enables a low-volume transport of the elevator car directly from the punching machine and flanging machine to the construction site. The walls, the roof and the floor of the elevator car have no protruding parts or edges on the side of the passenger space notwithstanding the panel mode of construction and are vandal-resistant without further measures. Refinishing of the surface is not necessary. An additional illuminated ceiling is superfluous if an aesthetically pleasing plate, for example a CrNi plate, is used for the roof panels. The apron or threshold resting of the floor panels does not need its own support construction and can be fastened by a few screws. The screws are used for car elements subject to high loads such as for connecting the threshold to the floor panels and connecting the entrance profile member to the roof panels.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 13 is a fragmentary exploded perspective view of details of a connecting profile member.

DESCRIPTION OF THE PREFERRED EMBODIMENT

Figure 1:
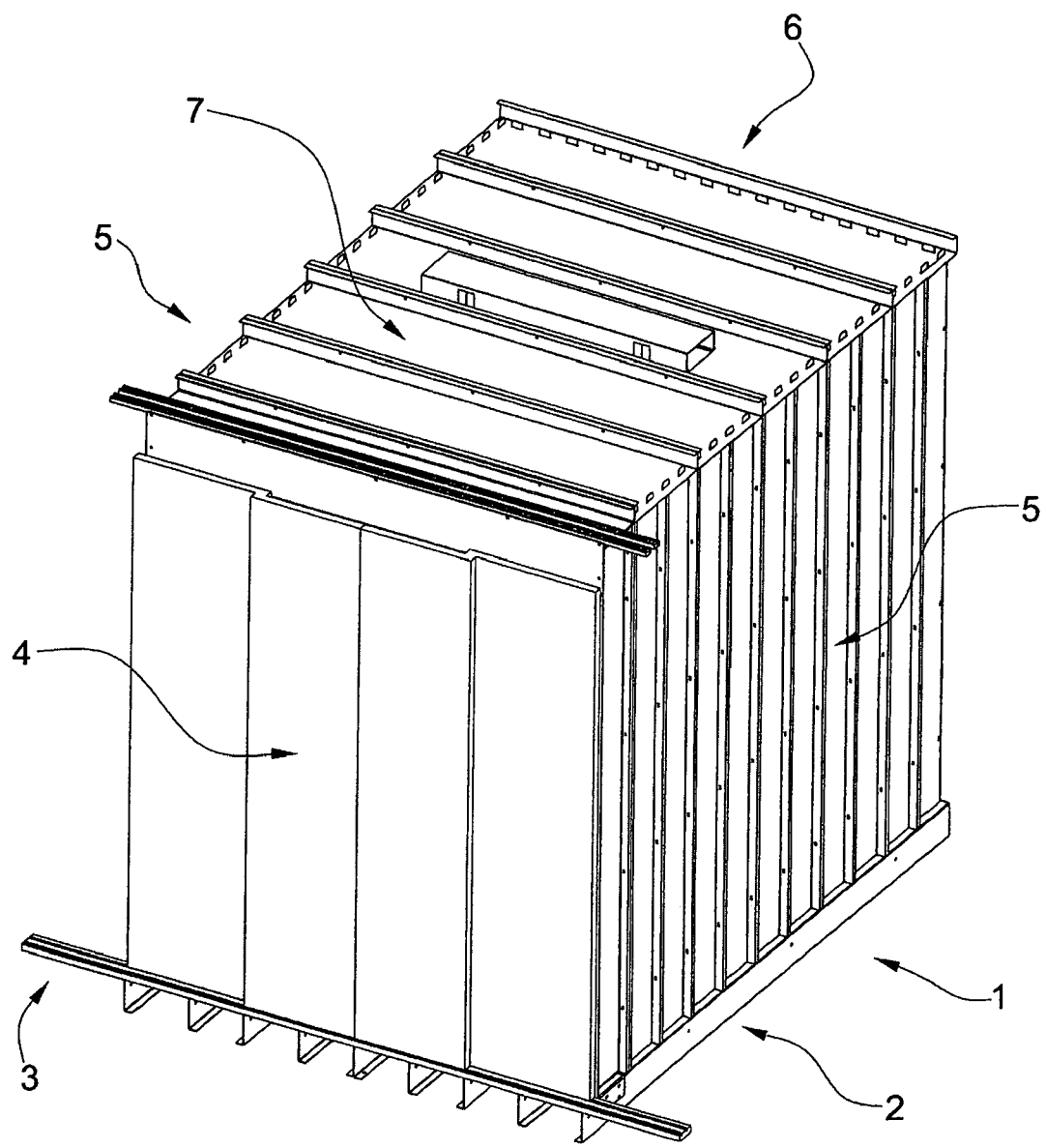
FIG. 1 is a perspective view of an elevator car of modular construction according to the present invention.

FIG. 1 shows an elevator car 1 of modular construction, consisting of a floor 2 with a threshold 3, doors 4, side walls 5, a back wall 6 and a roof 7.

Figure 2:
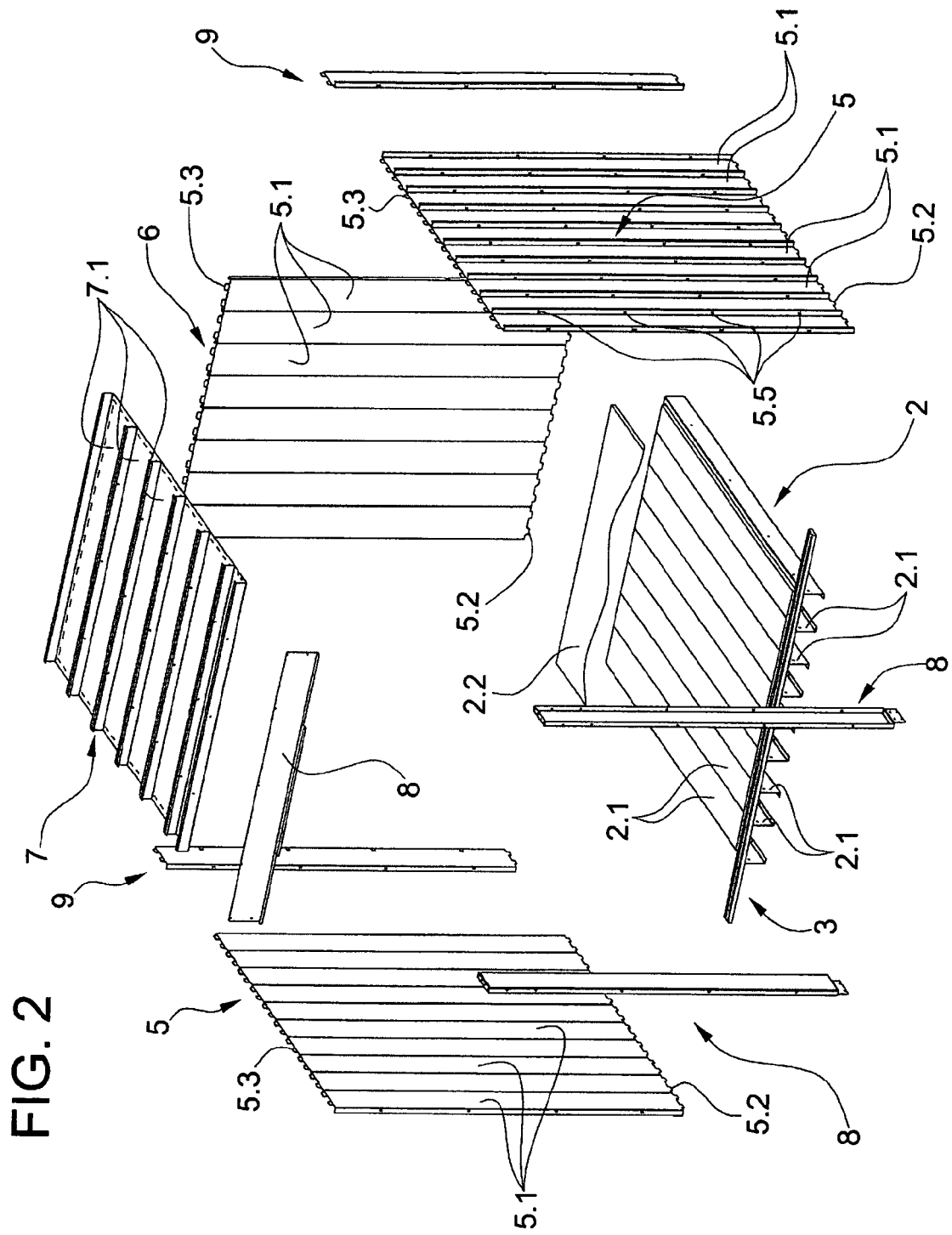
FIG. 2 is an exploded view of the elevator car shown in FIG. 1.

As shown in exploded illustration in FIG. 2, the floor 2 consists of a plurality of floor panels 2.1. The floor 2 is made of, in total, eight horizontally extending floor panels 2.1. The floor 2 can also be provided with a floor covering 2.2, for example a particle-board plate. The threshold 3 is connected with the floor panels 2.1. The side walls 5 each consist of ten vertically extending wall panels 5.1. The back wall 6 consists of eight vertically extending wall panels 5.1 and the roof 7 consists of six horizontally extending roof panels 7.1. The wall panels 5.1 of the side walls 5 and the back wall 6 are, in the present example, identical. Entrance profile members 8 are flush with the side walls 5 and the roof 7 at the front. The side walls 5 and the back wall 6 are connected by means of connecting profile members 9. Depending on the respective size of the elevator car 1, the number and size of the panels may vary.

Figure 3:
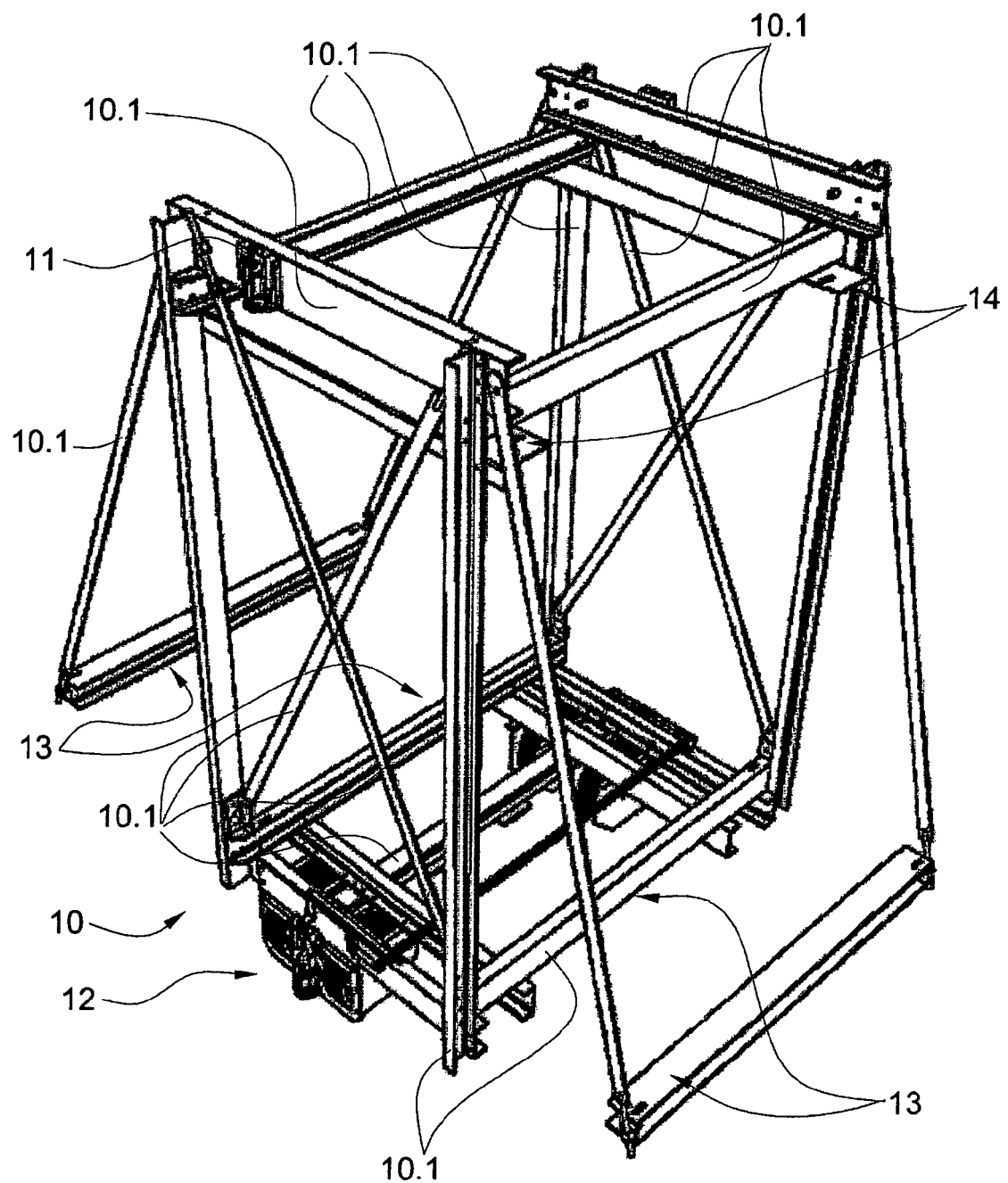
FIG. 3 is a perspective view of a support frame for the elevator car according to the present invention.

FIG. 3 shows a support frame 10 for the elevator car 1, which substantially consists of frame elements 10.1, at which guide shoes 11 and a safety brake device 12 are arranged at each frame side. Lower fastening profile members 13 of the support frame 10 support the floor panels 2.1. The roof panels 7.1 are connected with upper fastening profile members 14, which are constructed as, for example, angle plates.

Figure 4:
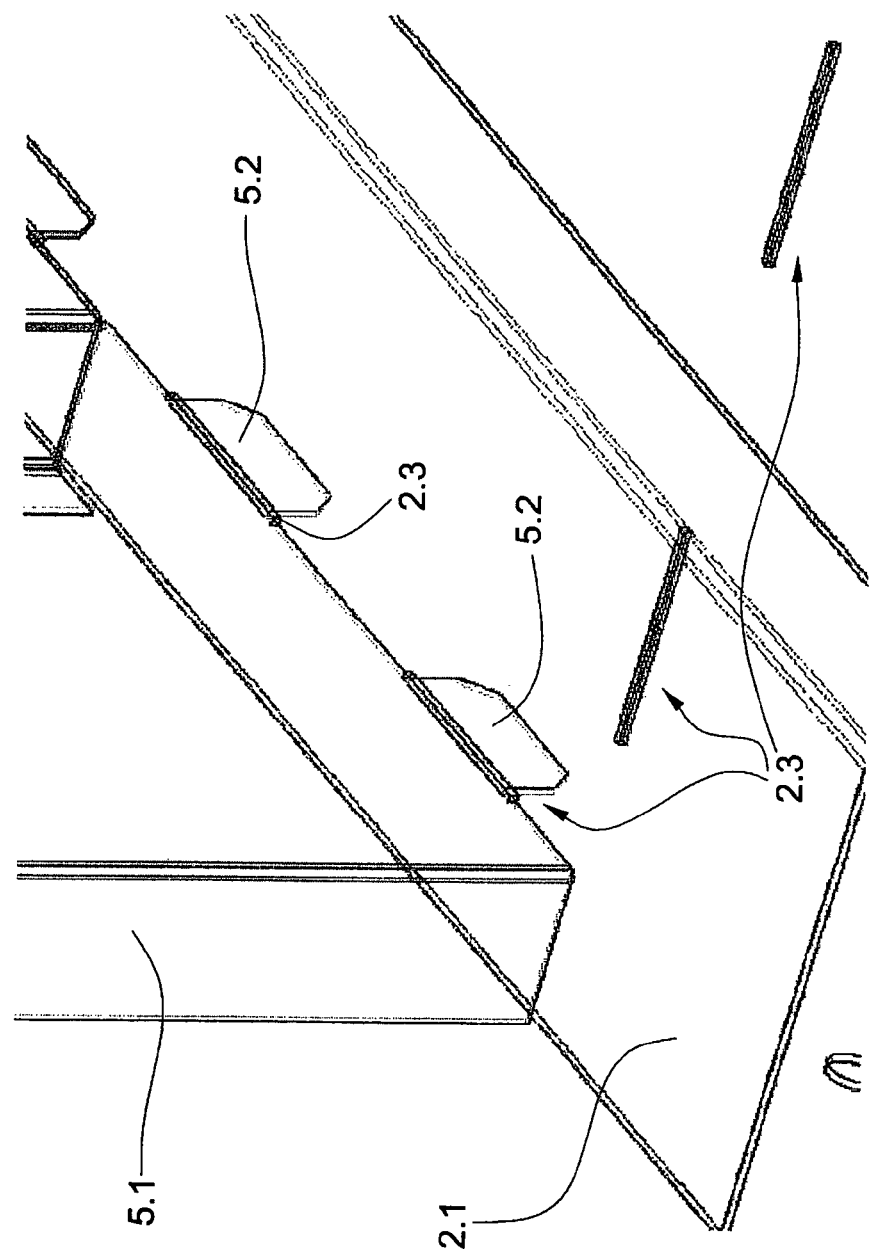
FIG. 4 is a fragmentary perspective view of connecting elements for a connection between the floor panels and the wall panels of the elevator car.

FIG. 4 shows the connecting elements for a connection between the floor panels 2.1 and the wall panels 5.1 of the side walls 5 or the back wall 6. The wall panel 5.1 is provided at the bottom with straps 5.2 which fit into slots 2.3 arranged at the floor panel 2.1 in longitudinal direction. Straps 5.2 of the back wall panels 5.1 fit in the slots 2.3 arranged in transverse direction. Each wall panel 5.1 and its straps 5.2 have been punched out of the same sheet metal plate. The wall panel 5.1 and the straps 5.2 are integral.

Figure 5:
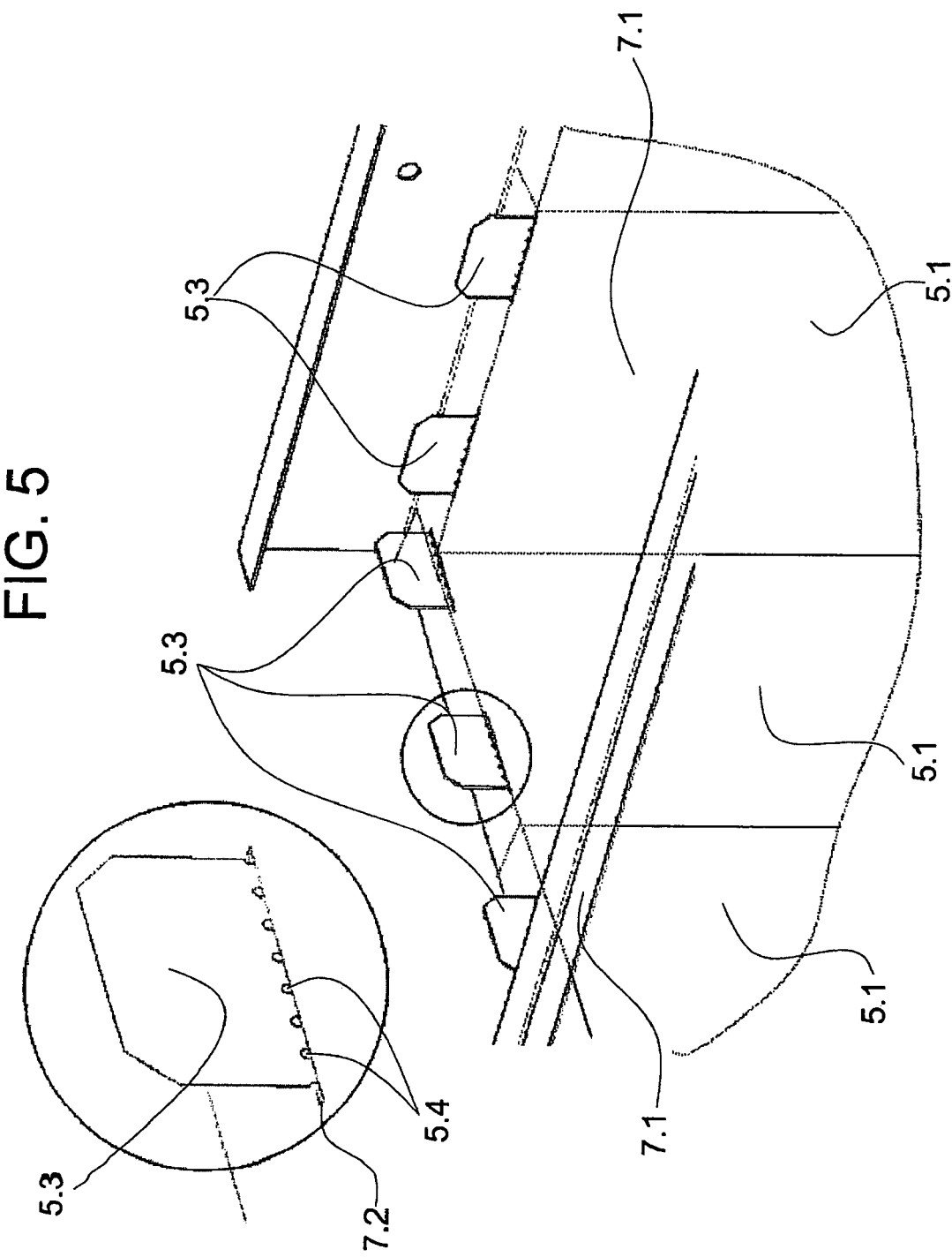
FIG. 5 is a fragmentary perspective view of connecting elements for a connection between the wall panels and the roof panels.

FIG. 5 shows the connecting elements for a connection between the wall panels 5.1 of the side walls 5 or the back wall 6 and the roof panels 7.1. The wall panel 5.1 is provided at the top with the straps 5.3 which fit in slots 7.2 arranged in the roof panels 7.1. Each wall panel 5.1 and its straps 5.3 have been punched out of the same sheet metal plate. Wall panel 5.1 and straps 5.3 are integral. The straps 5.3 are plugged through the slot 7.2 and thereafter bent over. Punched holes 5.4 of the straps 5.3 facilitate bending over and ensure a precise and sharp bending edge.

Figure 6:
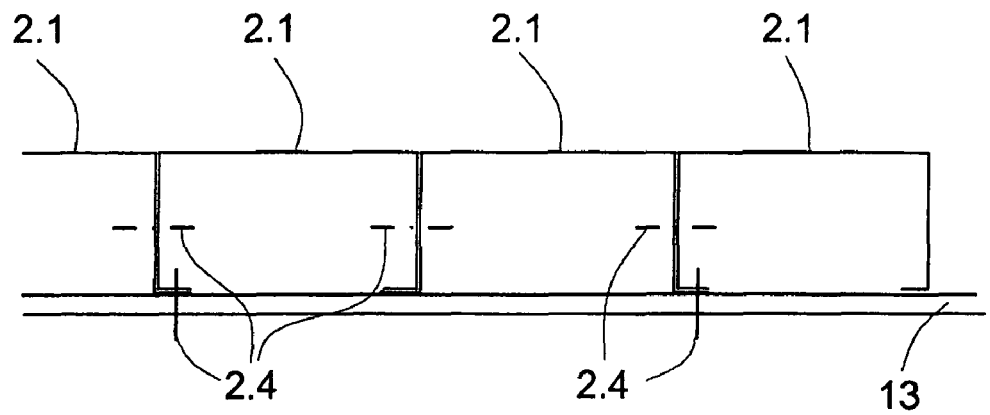
FIG. 6 is a profile view of the floor panels.

FIG. 6 shows the profiles of the floor panels 2.1, which are held together by means of screw connections 2.4 and are fixedly connected with the lower fastening profile member 13 of the support frame 10. The floor panels 2.1 form at the car side a smooth floor surface without edges or protruding parts. The floor covering 2.2 can be laid without further measures on the floor 2 formed by the floor panels 2.1.

Figure 7:
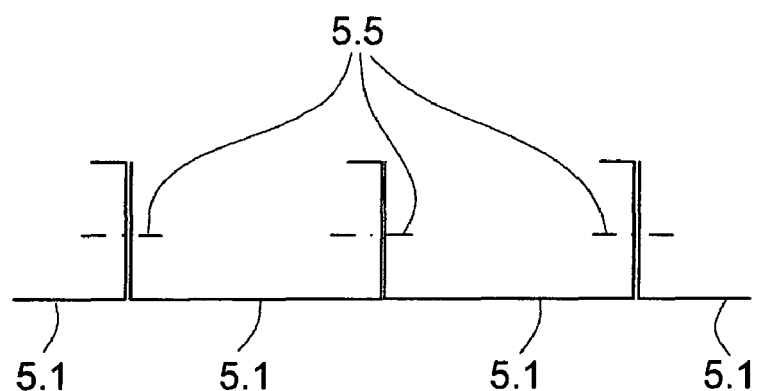
FIG. 7 is a profile view of the wall panels.
Figure 9:
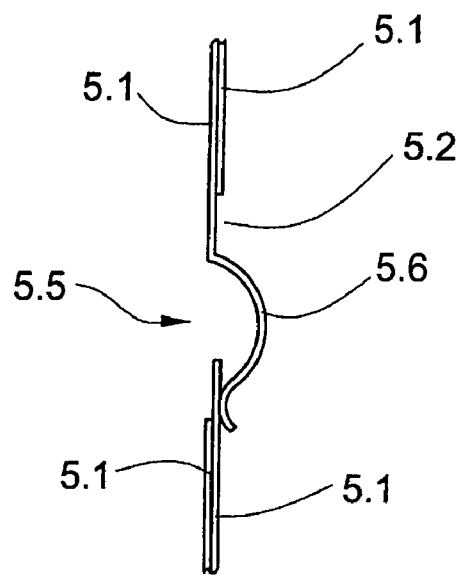
FIG. 9 is a side elevation view of a clip as connecting element.
Figure 10:
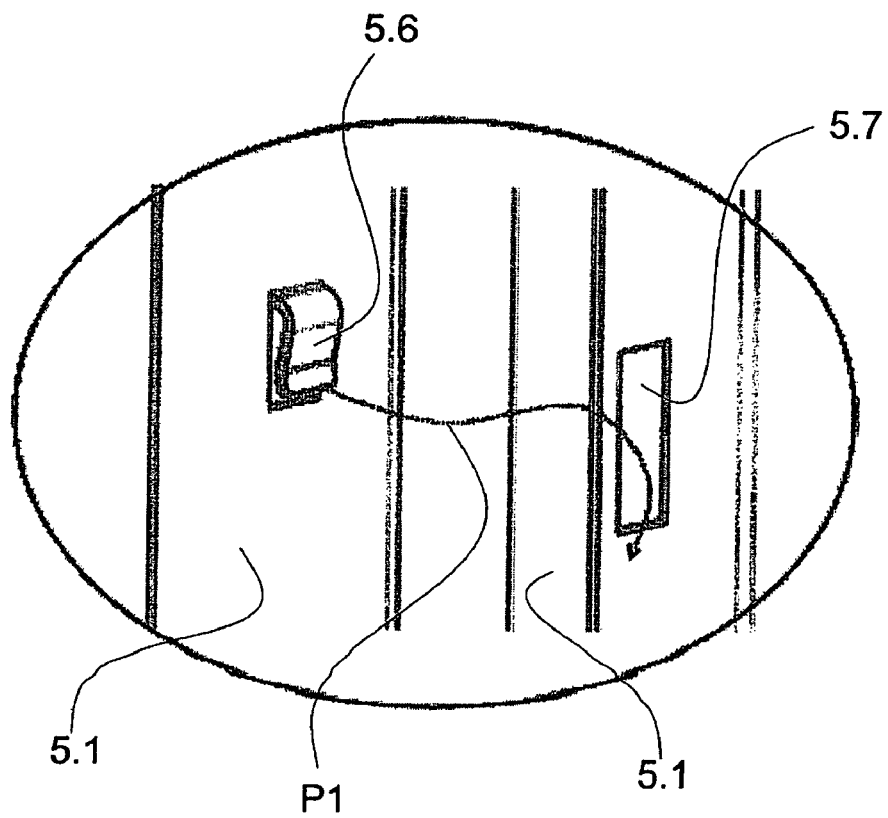
FIG. 10 is perspective view of a plug connection.

FIG. 7 shows the profile of the wall panels 5.1, which are connected together by means of plug connections 5.5. FIG. 9 and FIG. 10 show details of the connection. The wall panels 7.1 form at the car side a smooth wall surface without edges or protruding parts.

Figure 8:
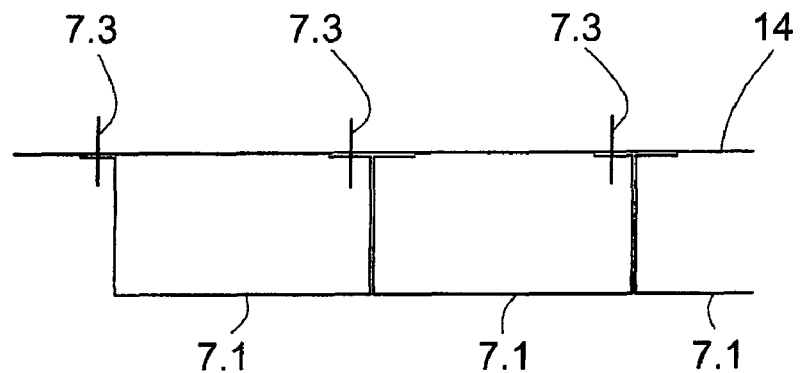
FIG. 8 is a profile view of the roof panels.

FIG. 8 shows the profile of the roof panels 7.1, which are fixedly connected by means of screw connections 7.3 with the upper fastening profile member 14 of the support frame 10. The roof panels 7.1 form at the car side a smooth roof surface without edges or protruding parts.

FIG. 9 shows the plug connection 5.5 of FIG. 7. A clip 5.6 has been punched out of the wall panel 5.1 as connecting element and has spring characteristics due to the shape predetermined in the punching out. The wall panel 5.1 and the clip 5.6 are integral. As shown in FIG. 10, the adjacent wall panel 5.1 has at the same height an opening 5.7 into which the clip 5.6 fits. The clip 5.6 is introduced into the opening 5.7 and the wall panel 5.1 moved downwardly until the clip 5.6 engages over the adjacent wall panel 5.1 and fixes. The movement of the clip 5.6 is symbolized by an arrow P1. On movement of the wall panel 5.1 downwardly, the straps 5.2 of the wall panel 5.1 are at the same time introduced into the slots 2.3 of the floor panel 2.1. For example four clips 5.6, which are distributed over the height of the wall panel 5.1, are provided.

Figure 11:
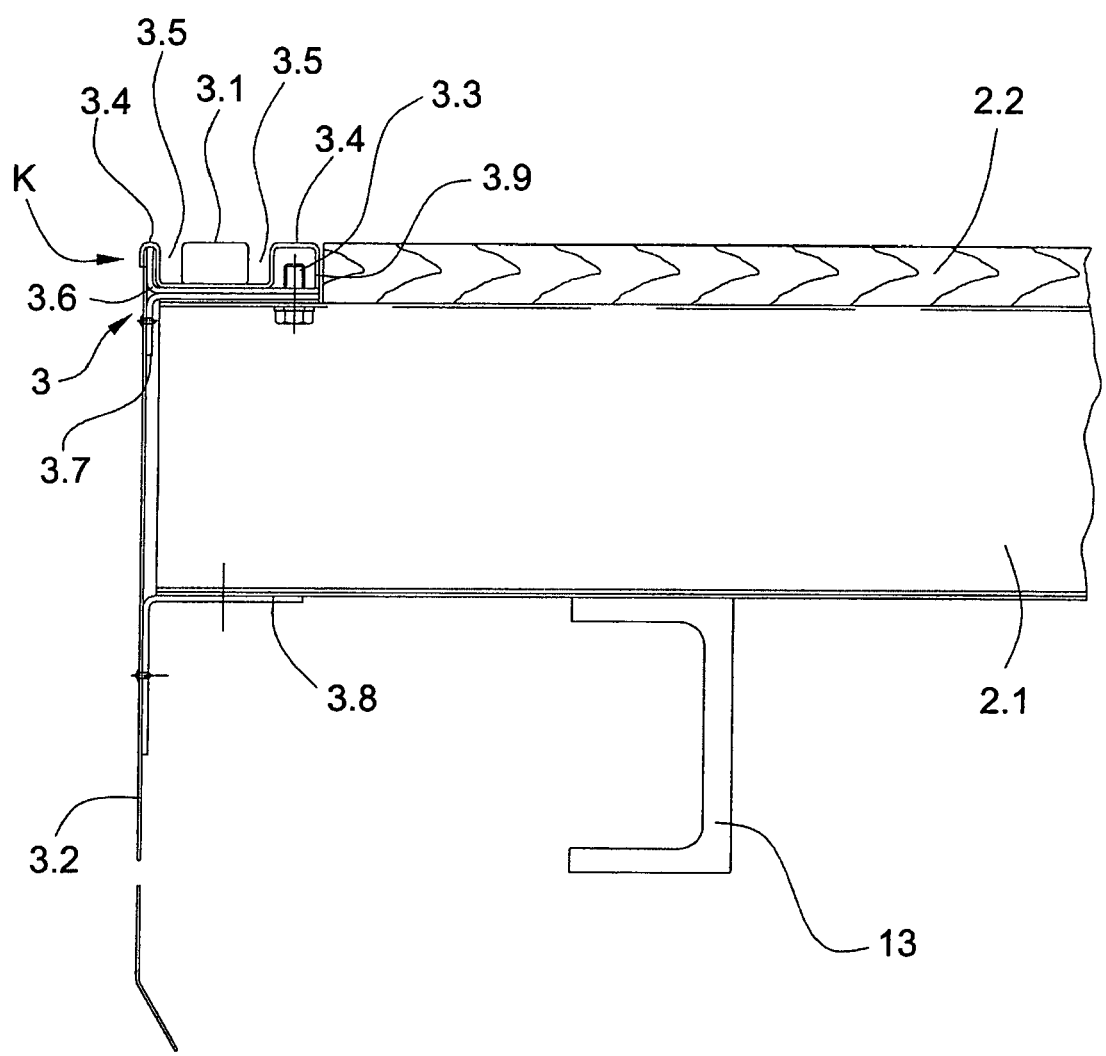
FIG. 11 is fragmentary profile view of details of a threshold.
Figure 10:
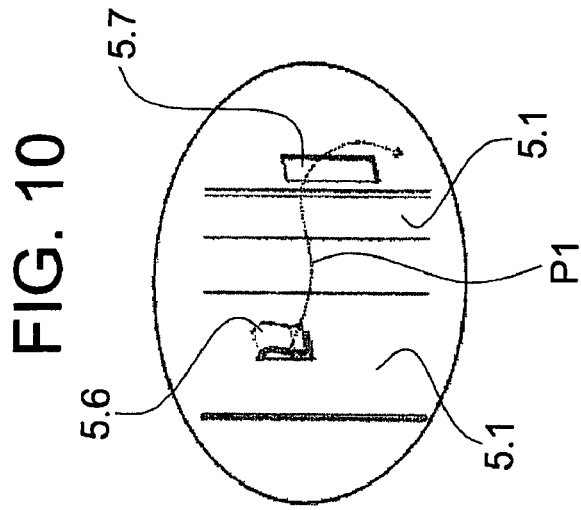

FIG. 11 shows details of the threshold 3, which consists of a first bracket 3.6, a roof panel 3.9, a second bracket 3.7 and a threshold profile member 3.1 and is arranged at the floor panels 2.1. The first bracket 3.6 and the second bracket 3.7 are connected with the floor panels 2.1 by means of screw connections 3.3.

In the edge region K the first bracket 3.6 is bent over upwardly and the second bracket 3.7 is bent over downwardly. A third bracket 3.8 is similarly bent over downwardly and serves for fixing an apron 3.2, which is also fastened to the second bracket 3.7. The roof panel 3.9 embraces the bent-over portion of the first bracket 3.6 and the apron 3.2 and covers the screw connections 3.3 and forms two projections 3.4. The threshold profile member 3.1 is arranged between the two projections 3.4, so that two channels 3.5 serving as guide grooves for the door leaf are formed. The threshold 3 supported by the floor panels 2.1 does not need its own support construction and can be fastened by a few screw connections 3.3.

Figure 12:
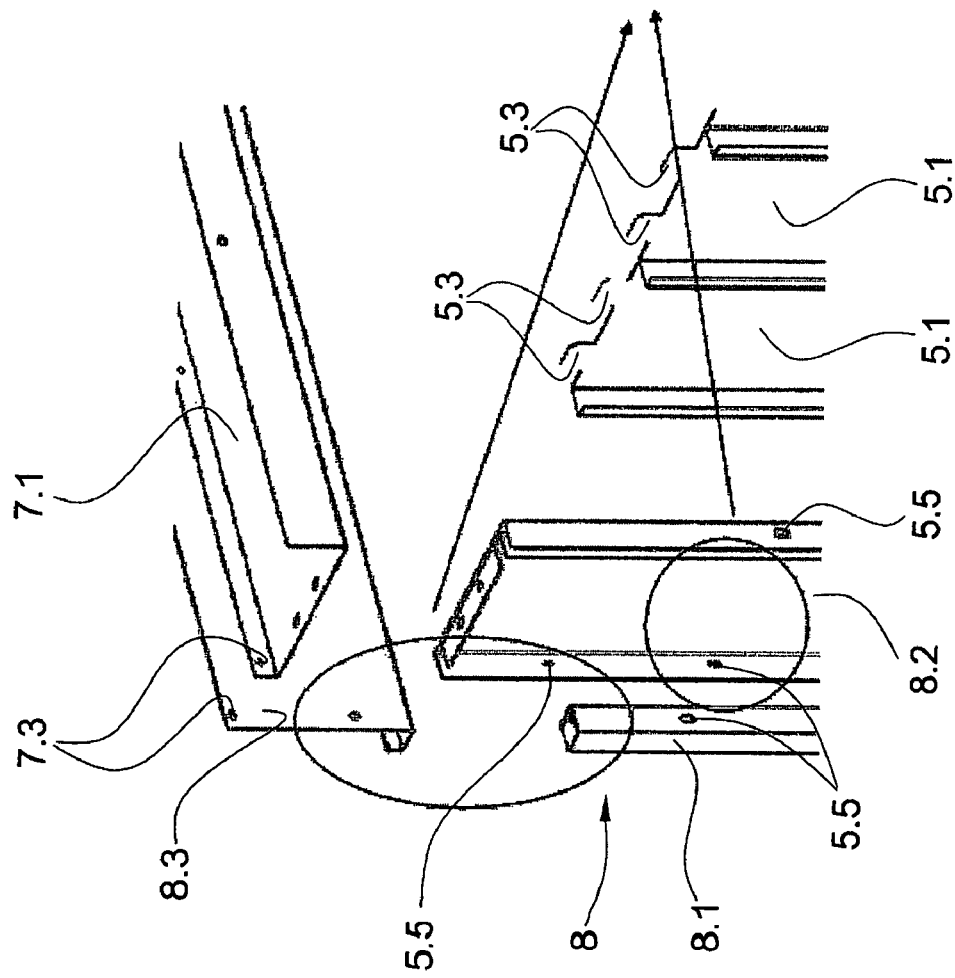
FIG. 12 is a fragmentary exploded perspective view of details of entrance profile members.

FIG. 12 shows details of the entrance profile members 8. A vertical entrance profile member 8 consists of a cubic profile member 8.1 and of a rectangular profile member 8.2. The horizontal entrance profile member 8 is constructed as an L-shaped profile member 8.2. The cubic profile member 8.1 and the rectangular profile member 8.2 are connectable by means of plug connections 5.5 according to FIG. 10 (reduced in scale). The rectangular profile member 8.2 and the adjacent wall panel 5.1 are connectable by means of the plug connections 5.5 according to FIG. 10. Horizontal L-shaped profile member 8.3 and the roof panel 7.1 are connectable by means of the plug connections 5.5 according to FIG. 10 and the screw connections 7.3.

FIG. 13 shows details of the connecting profile member 9, which is connectable by means of the plug connections 5.5 according to FIG. 10 (reduced in scale) with the adjacent wall panels 5.1. Straps 9.3 fit in slots 7.2 of the adjacent roof panel 7.1 and thereafter are bent over.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator car comprising:
   a floor made in modular form from a plurality of first panels;
   a pair of side walls made in modular form from a plurality of second panels;
   a back wall made in modular form from a plurality of third panels;
   a roof made in modular form from a plurality of fourth panels; and
   a plurality of connecting elements holding said floor, said side walls, said back wall and said roof together to form the elevator car, said connecting elements each being formed from a same sheet metal plate as an associated one of said floor first panels, said side walls second panels, said back wall third panels and said roof fourth panels, at least one of said side walls second panels and said back wall third panels having ones of said connecting elements being bent over from an installation orientation after connection to said roof fourth panels, wherein a line of holes is formed in the same sheet metal plate between the connecting elements and the associated said side walls second panels to facilitate the bending over of the connecting elements, wherein said second panels are wall panels, wherein each said wall panel has lower end straps disposed in connection with said first panels, said wall panels being connected by clip connections and each said wall panel having at an upper end straps disposed in connection with said fourth panels, wherein each said wall panel and said straps are formed from the same sheet metal plate, wherein each wall panel includes one of said clip connections and an opening offset laterally from said clip connection at a same height as said clip connection.

2. The elevator car according to claim 1 wherein each said clip connection comprises a clip punched out of an associated one of said wall panels, wherein said associated wall panel and said clip are integral.

3. The elevator car of claim 2, wherein each said clip connection has a shape that imparts a spring characteristic to said clip connection.

4. The elevator car of claim 3, wherein each said clip connection includes a major arcuate portion connected to said wall panel and a minor arcuate portion adjacent an end of the clip connection.

5. The elevator car of claim 4, wherein said clip connection is substantially S-shaped in profile.

6. The elevator car according to claim 1 wherein a threshold of the elevator car does not have a separate support construction and is arranged on said first panels.

7. The elevator car of claim 6, wherein said threshold includes an edge region having a first bracket and a second bracket, each of the first bracket and the second bracket connected to the floor with a screw connection, and a pair of projections formed by a roof panel disposed atop a bent over portion of the first bracket and the screw connection.

8. The elevator car of claim 7, wherein an apron of the elevator car is fastened to the second bracket.

9. The elevator car of claim 7, wherein a threshold profile member is arranged between the pair of projections to form two channels that serve as guide grooves for a door leaves of the elevator car.

10. The elevator car of claim 1, wherein said clip connection of one of said wall panels is disposed through said opening of an adjacent one of said wall panels.

11. The elevator car of claim 10, wherein said clip connection of said one of said wall panels disposed through said opening of said adjacent one of said walls panels is engaged over said adjacent one of said wall panels to connect said wall panels.

12. The elevator car according to claim 1 wherein said first panels are floor panels supported by a lower fastening profile member of a support frame.

13. The elevator car according to claim 1 wherein said fourth panels are roof panels disposed in connection with an upper fastening profile member of a support frame.

14. The elevator car of claim 1, wherein each wall panel includes a plurality of said clip connection and a plurality of said openings distributed over a height of each of said wall panels.

* * * * *